(12) United States Patent
Padidar et al.

(10) Patent No.: US 10,148,667 B2
(45) Date of Patent: *Dec. 4, 2018

(54) AUTOMATED CLASSIFICATION OF APPLICATIONS FOR MOBILE DEVICES

(71) Applicant: Appthority, Inc., San Francisco, CA (US)

(72) Inventors: Sasan Padidar, Pacifica, CA (US); Steve Hanna, Oakland, CA (US); Kevin Watkins, San Francisco, CA (US)

(73) Assignee: Appthority, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/470,717

(22) Filed: Mar. 27, 2017

(65) Prior Publication Data

US 2017/0250994 A1    Aug. 31, 2017

Related U.S. Application Data

(63) Continuation of application No. 14/838,278, filed on Aug. 27, 2015, now Pat. No. 9,639,694, which is a continuation of application No. 14/184,353, filed on Feb. 19, 2014, now Pat. No. 9,152,694.

(60) Provisional application No. 61/836,011, filed on Jun. 17, 2013.

(51) Int. Cl.
*G06F 17/30* (2006.01)
*H04L 29/06* (2006.01)
*G06F 21/51* (2013.01)

(52) U.S. Cl.
CPC ...... *H04L 63/105* (2013.01); *G06F 17/30598* (2013.01); *G06F 21/51* (2013.01); *H04L 63/1425* (2013.01); *G06F 2221/033* (2013.01); *H04L 63/101* (2013.01)

(58) Field of Classification Search
CPC ......... H04L 63/105; H04L 63/20; G06F 8/71; H04M 1/72561
USPC ................ 707/740, 737; 709/224, 203, 223; 706/12; 723/22
See application file for complete search history.

(56) References Cited

U.S. PATENT DOCUMENTS

| | | | |
|---|---|---|---|
| 7,644,150 B1 | 1/2010 | Nucci | |
| 8,347,386 B2 | 1/2013 | Mahaffey | |
| 8,533,844 B2 | 9/2013 | Mahaffey | |
| 8,544,095 B2 | 9/2013 | Mahaffey | |
| 8,776,218 B2 | 7/2014 | Wright | |
| 8,793,758 B2 | 7/2014 | Raleigh | |
| 9,152,694 B1 | 10/2015 | Padidar | |
| 9,203,864 B2 | 12/2015 | Luna | |
| 9,378,282 B2 | 6/2016 | Hubbard | |
| 2005/0108200 A1* | 5/2005 | Meik | G06F 17/3071 |
| 2005/0210035 A1 | 9/2005 | Kester | |
| 2009/0103524 A1 | 4/2009 | Mantripragada | |
| 2009/0158430 A1 | 6/2009 | Borders | |
| 2010/0257603 A1 | 10/2010 | Chander | |

(Continued)

*Primary Examiner* — Hung T Vy
(74) *Attorney, Agent, or Firm* — Van Pelt, Yi & James LLP

(57) ABSTRACT

Automated classification of applications ("apps") for mobile devices is provided. In some embodiments, automated classification of apps for mobile devices includes receiving an application ("app"); performing an analysis of the app using a classification engine; and determining an app category for the app based on the analysis performed using the classification engine.

20 Claims, 7 Drawing Sheets

(56) References Cited

U.S. PATENT DOCUMENTS

| | | |
|---|---|---|
| 2011/0023118 A1 | 1/2011 | Wright |
| 2011/0040706 A1 | 2/2011 | Sen |
| 2011/0047597 A1* | 2/2011 | Mahaffey .............. G06F 21/564 726/3 |
| 2011/0047620 A1 | 2/2011 | Mahaffey |
| 2011/0055925 A1 | 3/2011 | Jakobsson |
| 2011/0145920 A1 | 6/2011 | Mahaffey |
| 2011/0276396 A1 | 11/2011 | Rathod |
| 2012/0110174 A1 | 5/2012 | Wootton |
| 2012/0144025 A1 | 6/2012 | Melander |
| 2012/0221955 A1 | 8/2012 | Raleigh |
| 2012/0239786 A1 | 9/2012 | Repasi |
| 2012/0290640 A1 | 11/2012 | Mahaffey |
| 2012/0324568 A1 | 12/2012 | Wyatt |
| 2013/0086682 A1 | 4/2013 | Mahaffey |
| 2013/0117846 A1 | 5/2013 | Mahaffey |
| 2013/0212684 A1 | 8/2013 | Li |
| 2013/0238535 A1* | 9/2013 | Leppanen ............. H04W 4/025 706/12 |
| 2013/0326467 A1 | 12/2013 | Nair |

* cited by examiner

My Apps   Explore   My Policy

| Define | | | | |
|---|---|---|---|---|
| | Behavior | Enabled | Enforcement Action | Save |
| Violations | Tracks Location | On | Report only | |
| Apps Whitelist | Accesses Address Book | On | Report only | |
| Apps Blacklist | Accesses Calendar | Off | Report only | |
| EULA | Accesses SMS Archive | Off | Report only | |
| | Accesses Microphone | Off | Report only | |
| | Accesses Camera | On | Report only | |
| | Accesses External Storage | Off | Report only | |
| | Accesses IMEI/UDID | Off | Report only | |
| | Cloud File Storage (DropBox) | Off | Report only | |
| | Cloud File Storage (Box) | Off | Report only | |
| | Cloud File Storage (SkyDrive) | Off | Report only | |
| | Cloud File Storage (SugarSync) | Off | Report only | |
| | Cloud File Storage (Google Drive) | Off | Report only | |
| | Cloud File Storage (ICloud) | Off | Report only | |

FIG. 5

AUTOMATED CLASSIFICATION OF APPLICATIONS FOR MOBILE DEVICES

CROSS REFERENCE TO OTHER APPLICATIONS

This application is a continuation of co-pending U.S. patent application Ser. No. 14/838,278, entitled AUTOMATED CLASSIFICATION OF APPLICATIONS FOR MOBILE DEVICES filed Aug. 27, 2015 which is incorporated herein by reference for all purposes, which is a continuation of U.S. patent application Ser. No. 14/184,353, now U.S. Pat. No. 9,152,694, entitled AUTOMATED CLASSIFICATION OF APPLICATIONS FOR MOBILE DEVICES, filed Feb. 19, 2014, which claims priority to U.S. Provisional Patent Application No. 61/836,011, entitled AUTOMATED MOBILE APPLICATION CLASSIFICATION, filed Jun. 17, 2013, both of which are incorporated herein by reference for all purposes.

BACKGROUND OF THE INVENTION

An application, also referred to as an "app," generally refers to a software application that executes on a computing device, such as a mobile device. For example, mobile devices include smart phones, phablets, tablets, laptops, and/or other mobile devices. Various application platforms exist for different operating systems, such as Apple iOS® platforms, Google Android® platforms, and Microsoft Windows® platforms. Application markets exist for each of these application platforms, which can make available thousands to millions of different apps for such platforms.

For example, various apps are available for executing on smart phones such as the Apple iPhone® or Samsung Galaxy®, tablets such as the Apple iPad® or Google Nexus®, embedded devices executing the Google Android® operating system such as those shipped by Mentor Graphics and their partners, and computer operating systems such as Apple Mac OS X® and Microsoft Windows 8®.

BRIEF DESCRIPTION OF THE DRAWINGS

Various embodiments of the invention are disclosed in the following detailed description and the accompanying drawings.

FIG. 5 is another screen diagram illustrating a graphical user interface of a system for providing automated classification of apps for mobile devices in accordance with some embodiments.

DETAILED DESCRIPTION

Figure 1:
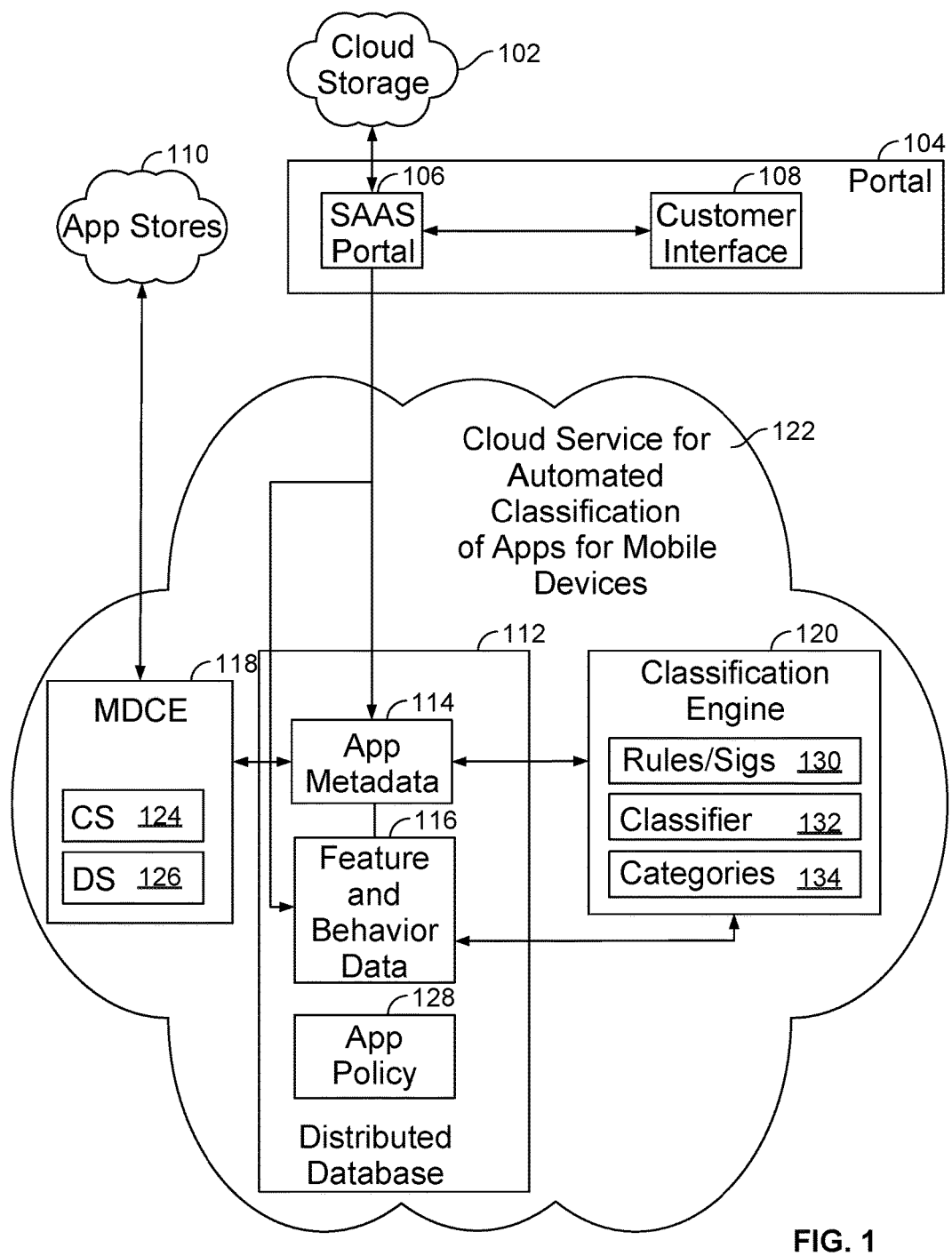
FIG. 1 is a functional block diagram of a cloud service for providing automated classification of applications ("apps") for mobile devices in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As the number of mobile applications available continues to increase, organizations such as enterprises and end-users would benefit from a mechanism that can efficiently identify and categorize applications. The process of classifying applications has traditionally been a manual process that is generally time consuming, and as a result, impractical for a large number of applications.

Moreover, manual or human classification of applications is susceptible to errors (e.g., prone to human errors in determining such classifications). Further, an application generally cannot always be classified into categories using a pre-defined classification set if it is contained in a larger set of applications that may not contain classifications at all.

What are needed are techniques for automated classification of applications for mobile devices.

Accordingly, techniques for automated classification of applications ("apps") for mobile devices are provided. In particular, various techniques for automating classifications of apps into a set of categories are disclosed (e.g., without the need of predefining a list of behaviors or features each application has to conform to in order to be in a particular category).

Mobile applications can behave in ways that make each application unique when focusing on, for example, one or more behaviors performed by the application (e.g., app behaviors). For example, generalizations can be used in order to classify an app to a particular category based on one or more app behaviors. These behaviors can be automatically analyzed to determine similarities with other mobile applications, which can be applied using various techniques as described herein to categorize/group such mobile applications into various predefined categories, such as business apps, productivity apps, file sharing, games, social, and/or other categories/groups, which can be implemented automatically (e.g., without having to manually categorize these groups, which would require human intervention). As another example, various features associated with the app can also be identified as an attribute that can be used to facilitate an automated classification of the app into one or more app categories.

In one embodiment, a system for automated classification of apps for mobile devices implements a guided classification and machine learning techniques to provide automated mobile application classification (e.g., categorical classification of mobile applications). In an example implementation, the categories can be specified a priori, before classification and retraining is performed.

For example, an app can be classified into a particular app category, which can then be used to apply a policy to determine whether the app is an approved app for the app category or not approved for that particular app category (e.g., a safe or unsafe app based on the app policy, such as an enterprise app policy). As an example, a file sharing application that performs a high number of behaviors related to file sharing that allows users to take notes can be categorized under a "file sharing" category rather than a "productivity" category. However, in addition to being classified into a dominant or primary category, the likelihood that a given application is in a given category can be calculated as a probability over all categories. In the above example, assuming no other activity, the category (e.g., app category) can be given as a probability percentage of 60% for file sharing and a probability percentage of 40% for productivity, with 0% for each of the other categories (e.g., games, messaging, and/or various other app categories).

For example, techniques for automated classification of apps for mobile devices can be used by an entity, such as a company (e.g., ACME Company) that is concerned with ensuring that users (e.g., employees and/or other users) who have access to network resources on the company's internal networks and computing resources on such internal networks and who use various mobile devices to access the company's internal networks, to ensure that apps that are available from public app stores or other app marketplaces (e.g., including any private app stores, such as hosted by ACME Company or other entities) do not violate ACME Company's app policy (e.g., ACME Company can configure an enterprise app policy that specifies approved/safe apps and unapproved/unsafe apps for one or more app categories). ACME Company can identify a BAD-Productivity app as unsafe, and suggest as an alternative, an approved GOOD-Productivity app that ACME Company specifies in its enterprise app policy to be a safe productivity app. BAD-Productivity app can be determined to be unsafe based on one or more attributes (e.g., including app behaviors or various features), such as location tracking, insecure cloud storage, and/or various other attributes.

In some embodiments, automated classification of applications ("apps") for mobile devices includes receiving an application ("app"); performing an analysis of the app using a classification engine executed on a processor; and determining an app category for the app based on the analysis performed using the classification engine.

Example app categories can include business, calendar, electronic mail (e-mail), file sharing/cloud storage, games, maps, messaging, music, office productivity, photo, social video, web browser, and/or other app categories. In some implementations, a given app can be classified into one or more app categories (e.g., in some cases, calculating probabilities/scores for associating the app with each of the one or more categories).

In one embodiment, automated classification of apps for mobile devices further includes automatically classifying the app into the app category using the classification engine. For example, the app can be classified with a probability value that the app is associated with the app category. In an example implementation, the app categorization can be determined at least in part based on an app behavior (e.g., one or more behaviors performed by the app monitored during execution of the app, such as by monitoring dynamic behavior of the app during execution of the app in an emulation environment, such as an instrumented virtual machine (VM) environment to monitor the app behavior in an emulated mobile device environment).

In one embodiment, automated classification of apps for mobile devices further includes generating a report with at least one app categorization for the app. For example, the report can include at least one suggested app for the app category to suggest an alternative to the app if that is not approved for the app category. In some cases, if the app is not approved based on an app policy, then the report can include at least one suggested app for the app category based on the app policy. As another example, if the app is not approved based on an enterprise app policy, then the report can include at least one suggested app for the app category based on the enterprise app policy (e.g., in which the enterprise app policy can be configurable by an enterprise for managing apps on mobile devices associated with the enterprise, which allows for an enterprise customizable/configurable app policy to indicate safe and unsafe apps for one or more app categories). As yet another example, if the app is a blacklisted app for the app category based on the app policy, then the report can include at least one suggested app for the app category, in which the at least one suggested app for the app category is a whitelisted app for the app category based on the app policy (e.g., if the app category is file sharing/cloud storage, and the app policy has blacklisted a SHARE-ALL app, but the app policy has whitelisted an OPEN-FILE-SHARE app, then the report can suggest the OPEN-FILE-SHARE app as an approved/whitelisted file sharing app that can be used as an alternative to the unapproved/blacklisted SHARE-ALL app for the file sharing/cloud storage app category).

In one embodiment, the app policy is configurable by an enterprise for managing apps on mobile devices associated with the enterprise. For example, an enterprise can customize/configure the enterprise app policy to specify whether apps are deemed to be safe apps or unsafe apps for one or more app categories. In an example implementation, the enterprise can configure unsafe app behaviors and/or unsafe features of apps, such as a location tracking behavior, which can be configured in the enterprise app policy as an unsafe behavior of apps for one or more app categories (e.g., location tracking can be configured to be an unsafe behavior for the file sharing/cloud storage app category and/or other app categories, but can be configured to be a safe behavior for other app categories, such as a map or navigation app category).

In one embodiment, automated classification of apps for mobile devices further includes applying a classification model using the classification engine to classify the app (e.g., into one or more app categories). Example classification models can include classifying apps based on one or more of the following: app type, common characteristics (e.g., URL/hostname or other characteristics), whitelist/ blacklist, app behavior, automated rules and signature classification (e.g., shown as a Category Finder in FIG. 3), and a safety model (e.g., safe, unsafe). As further described below, automated classification of apps for mobile devices can be performed by applying one or more classification models using various techniques as described herein.

In one embodiment, automated classification of apps for mobile devices further includes applying a classification algorithm using the classification engine to classify the app (e.g., into one or more app categories). Example classification algorithms include Bayes with term frequency-inverse document frequency (TF-IDF), Bayesian Networks, Decision Trees, and various other machine learning algorithms. As further described below, training data can be used to improve the automated classification of apps using the various classification techniques described herein. As also further described below, automated classification of apps for mobile devices can be performed by applying one or more classification algorithms using various techniques as described herein.

In one embodiment, automated classification of apps for mobile devices further includes using the classification engine to classify the app (e.g., into one or more app categories) based on one or more features/feature sets (e.g., network traffic activity/patterns, on screen and graphical user interface (GUI) features, app included resources such as media, text, etc., and app collected data such as files, SMS/MMS, GPS, camera, and/or microphone).

These and various other examples for applying techniques for automated classification of apps for mobile devices are discussed below with respect to various embodiments.

FIG. 1 is a functional block diagram of a cloud service for providing automated classification of applications ("apps") for mobile devices in accordance with some embodiments. As shown, cloud service for automated classification of apps for mobile devices 122 receives apps from app stores 110 (e.g., apps can be pushed or pulled from such app stores, such as using an API for batch jobs to download one or more apps for analysis). Example app stores can include public app stores (e.g., Google PlayStore, Apple App store, and/or other public app stores) and/or private app stores (e.g., ACME Company can have a private app store for employees or other users of ACME Company to access apps for their mobile devices). As also shown, cloud service 122 is in communication with a portal 104, which is in communication with cloud storage 102.

As further described below, cloud service 122 can perform an analysis of the app using classification engine 120 (e.g., the classification engine can be implemented in software that is executed on a processor) and determining an app category for the app based on the analysis performed using the classification engine. Example app categories can include business, calendar, electronic mail (e-mail), file sharing/cloud storage, games, maps, messaging, music, office productivity, photo, social video, web browser, and/or other app categories. In an example implementation, a given app can be classified into one or more app categories (e.g., in some cases, calculating probabilities/scores for associating the app with each of the one or more categories).

In one embodiment, an architecture for providing automated classification of apps for mobile devices includes a Metadata Collection Engine (MDCE) 118, End User Portal and interface (EUP or portal) 104, and Classification Engine 120, which can facilitate determining whether an analyzed app can be classified into one or more app categories. As shown, MDCE 118 and classification engine 120 are implemented as part of a cloud service 122. For example, portal 104 and cloud service 122 can be provided as a web service or cloud service, which can be executed on one or more servers that include one or more processors for executing software implemented functions (e.g., using a hosted service provider, such as Amazon Web Services or another service provider).

As shown in FIG. 1, while presented as sequential process steps, such process steps can be performed asynchronously. MDCE 118 is implemented as a part of a cloud service for automated classification of apps for mobile devices, shown as cloud service 122. In particular, MDCE 118 scrapes and downloads apps from app stores. For each app, MDCE 118 analyzes the app (e.g., using various static and dynamic techniques, such as described herein, to extract one or more behaviors, features, and/or other attributes of the app), extracts metadata from the app, and stores the extracted app metadata 114 in a distributed database 112 (e.g., or another form of a data store) for the cloud service. For example, MDCE 118 can automatically extract features from an app (e.g., an app for an iOS platform, Android platform, Microsoft platform, and/or other mobile device operating system/ device platform) and/or from the market place source of the app, including one or more of the following: app origin/ source information (e.g., metadata associated with the market place source for the app, such as a category of the app in the app store (such can be used as an indicator but such is not relied upon as an accurate category identifier for the app) and/or a distributor (as a distributor/developer may have a bad reputation, which can be used as input for whether the app desires to be associated with that distributor/developer)), comments, and/or other information associated with the source of the app in a public app store or other source of the app, images, executable code (e.g., native binary), script or source code, included files, HTML (e.g., HTML files), text (e.g., text files), images (e.g., image files), video (e.g., video files), audio (e.g., audio files), embedded files, compressed archives, certificates/signed files, advertising identifiers, SDKs used in the app, authentication server identifiers, GUI/screen shots of various stages of the app during execution, and/or other features or attributes that can be extracted from the app during static and/or dynamic analysis. MDCE 118 stores such extracted features of the app in app metadata 114.

Figure 4:
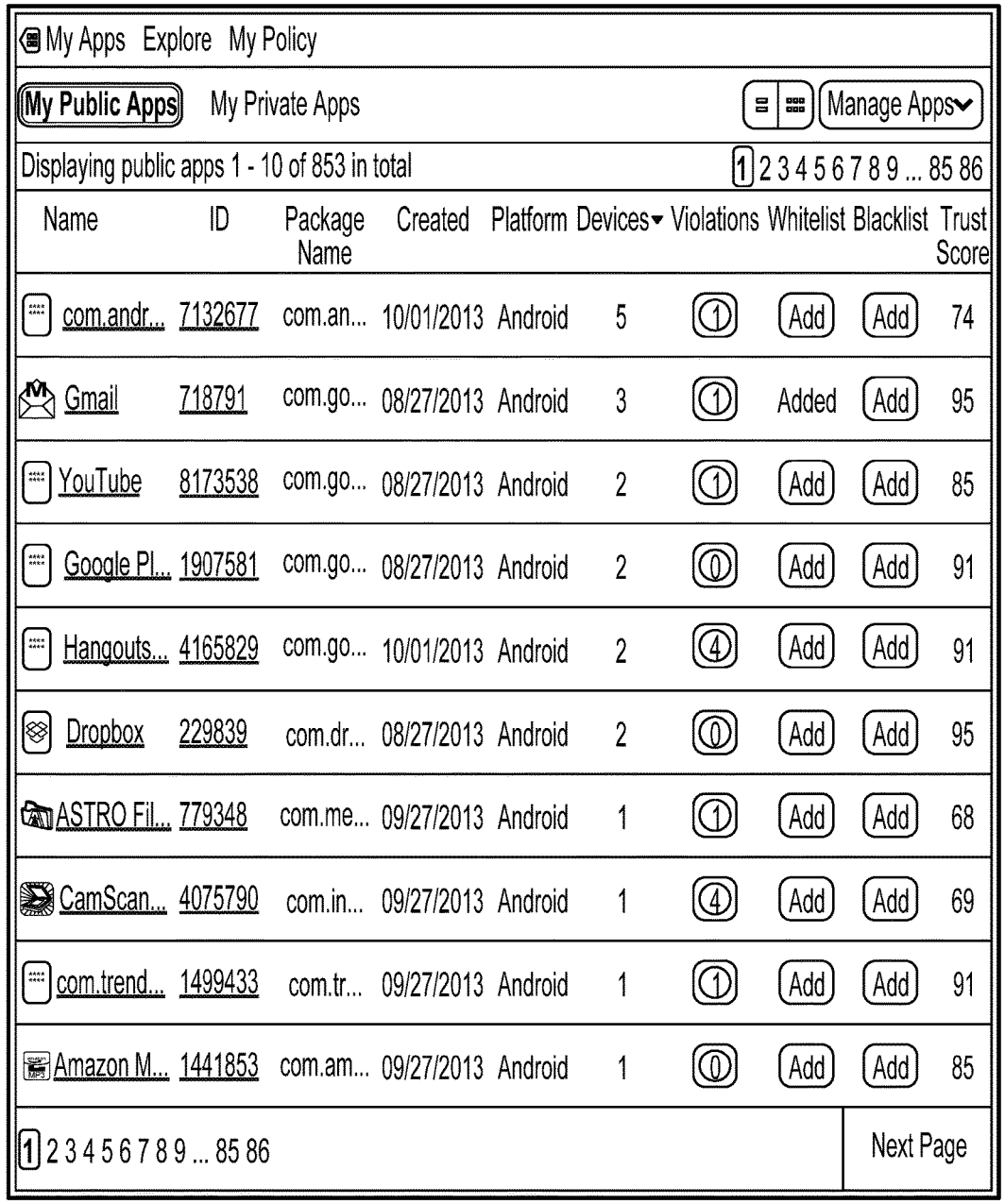
FIG. 4 is a screen diagram illustrating a graphical user interface of a system for providing automated classification of apps for mobile devices in accordance with some embodiments.

For example, a user, such as a security/network administrator, for a customer of the cloud service for automated classification of apps for mobile devices can visit portal 104 by interacting with a customer interface 108 of a software as a service (SAAS) portal 106 to input various policy information associated with an entity (e.g., customer's company, such as ACME Company). For example, the user can input features or behaviors that are allowed or not allowed for each app category (e.g., location tracking, recording, access to contacts, and/or other features or behaviors) that can be applied as an enterprise policy using various techniques described herein. As another example, the user can input various approved/whitelisted or unapproved/blacklisted apps for each app category that can be applied as an enterprise policy using various techniques described herein. FIG. 4 illustrates an example user interface for configuring app policies, as further discussed below. The various feature and behavior information that is configured (e.g., as policy criteria) and/or extracted (e.g., based on app analysis to provide any such feature and behavior information related to the app) is stored in feature and app behavior data 116 of distributed database 112. As further described below, a classification engine 120 of cloud service for automated classification of apps for mobile devices 122 uses app metadata 114 and feature and behavior information 116 to facilitate the generation of a report that identifies any apps that were determined to be in violation of an app policy and/or an app policy for the entity (e.g., an enterprise app policy), and the report is output to the user using portal 104 (e.g., the report can identify the apps and any supporting data that triggered a violation of the policy by such apps, such as which apps are blacklisted for a given app category and suggested apps that are whitelisted for that app category, and/or other information, such as why a particular app is blacklisted or in violation of the app policy). As also shown, portal 104 is in communication with cloud storage 102 for storing, for example, customer reports, customer preferences and user information, and/or other information.

In one embodiment, classification engine 120 of cloud service for automated classification of apps for mobile devices 122 uses app metadata 114 and feature and behavior data 116 to determine whether an app is in violation of an app policy (e.g., the policy can also be stored in distributed database 112, shown as app policy 128). For example, classification engine 120 can perform various techniques as described herein to determine whether the app is in violation of an app policy and/or an enterprise app policy. Based on a classification of each analyzed app and by applying the app policy, a report can be generated that identifies any apps that are in violation of the app policy and/or the enterprise app policy. For example, the report can include a score (e.g., a probability score) based on the analysis for each app of whether the app can be classified into a specified app category or classification. If an app's probability score exceeds or meets a threshold (e.g., a score determined to indicate a high probability of a match), then the app can be determined to be associated with the app category or classification (e.g., if the probability score exceeds 75% or some other threshold value that the analyzed app is a game, then the analyzed app can be categorized as a game, and the policy for games can be applied to the analyzed app to determine whether or not the analyzed app violates the app policy requirements for games, such as no location tracking and/or other criteria/requirements). The app(s) (if any) determined to be in violation of the app policy and the probability score (if any) can be stored in feature and behavior data 116, which can then be used for reporting to the entity using portal 104. In one implementation, portal 104 includes a report generation interface that shows the customer the apps (e.g., along with supporting data) determined to be in violation of the app policy for the entity as further described herein. FIG. 5 illustrates an example user interface for providing such an app compliance report, as further discussed below.

In one embodiment, MDCE 118 scans applications in an automated manner to determine what data is included within the application. This data (e.g., app metadata) is extracted, stored, and used by classification engine 120 to facilitate classification of the app. For example, the app can include a collection of files that accompany the app, including executable code, resources, and all data contained within the application package. MDCE 118 can scan the app and can extract various data including, for example, the following: images, strings, keywords and phrases, URLs, email addresses, phone numbers, databases, Software Development Kits (SDKs) in use, and any other attributes and/or identifying information that may be used to facilitate classifying the app into one or more app categories. The extracted data can also be scanned and analyzed (e.g., decoded, parsed, and/or dissected) to determine whether the app is in violation of the app policy for the entity. In one embodiment, the application is analyzed both statically and dynamically to extract the app metadata, such as URLs within the app (e.g., including URLs that are dynamically resolved and followed URLs).

In one implementation, the associated market page(s) from which the app was downloaded from an app store are also analyzed to determine whether the app is not properly classified in the app store (e.g., public app store and/or private app store). For example, an app may misrepresent that the app is an office productivity app, but based on automated analysis using various techniques disclosed herein, the app is determined to actually be a game and can request that the app be re-categorized as a game in the app store. As another example, if an app is determined to be an office productivity app but is also determined to be in violation of ACME Company's app policy, then the app can be reported for removal from ACME Company's private app store and/or for automated removal from mobile devices associated with ACME Company (e.g., mobile devices managed by ACME Company for its users, such as employees and/or contractors). In some cases, an alternative app(s) that is approved by ACME Company's app policy for the office productivity category can be suggested to users who attempt to download/install or had removed the app that was determined to be in violation of the enterprise app policy for ACME Company (e.g., using enterprise MDM service that can be configured to remove the identified/specified app from one or more managed mobile devices). In one implementation, ACME Company can also initially configure and periodically update a list of authorized apps by the app category (e.g., or for all app categories, global policy requirements) associated with ACME Company and/or based on features/behaviors by the app category (e.g., or for all app categories, global policy requirements) using portal 104. The reports can also provide customers such as ACME Company an opportunity to provide a feedback loop to verify which reported apps are actual violations of their app policy and which are authorized apps and/or are false positives (e.g., are reported as potential violations, which can be indicated by a confidence metric in the app violations report, but are not actual violations, for example, the app may be misclassified as a game when it is actually an office productivity app, which can be used to improve subsequent analysis performed by the classification engine). Accordingly, the reporting and evaluating of reported app violations using portal 104 can provide for a feedback loop that can improve future results generated by cloud service 122.

In one embodiment, MDCE 118 includes multiple scanner engines, including a continuous scanner (CS) 124 and a desktop scanner (DS) 126, and also is in communication with distributed database 112 as shown. For example, the scanner engines can be run within cloud 122 (e.g., or can be implemented using other execution environments). In some implementations, the scanner engine results can be stored in a high performance database relating to the application metadata, shown as app metadata 114, accessible by all of the instances of the scanner engines currently in operation. As also shown, app metadata 114 is used in conjunction with feature and behavior data 116 by classification engine 120 to determine whether the app is in violation of an app policy.

In one embodiment, CS 124 visits (e.g., periodically or based on a customer's request for an updated report) official and unofficial app markets (e.g., public and/or private app marketplaces, and/or various other unofficial sources of apps available via the Internet or World Wide Web), automatically downloads apps (e.g., without user intervention), and then automatically analyzes the downloaded apps. For example, CS 124 can perform various techniques as described herein for extracting features of the app to provide app metadata to app metadata store 114. This scanning can occur periodically or continually across app markets in a particular geography and/or for app markets around the world. In one implementation, when a scan of an app is conducted by CS 124 of MDCE 118, in addition to storing app metadata as described above, CS 124 can also determine and store one or more of the following: a date and time of the scan; a version of the application; a snapshot of the app market page advertising the app (e.g., source page from which the app was advertised/available for download from the source app store); a URL of the app store from which the application was downloaded; and any other data that is relevant to or indicates an application version, origin, or description of the app (e.g., developer related information, comments or reviews about the app on the app store, and/or other information). In some cases, if a newer version of the app has new content or behavior that changes a classification of the app (e.g., or probability score values of any such app classifications) and/or violates an app policy, then a new entry can be created within distributed database 112 to record how the app has changed in this newer version and that such triggered a new or additional app classification and/or if such triggered a new or additional app policy violation.

In one embodiment, classification engine 120 includes rules and/or signatures 130 that are used by classifier 132 to automatically classify an analyzed app into one or more categories 134. In one implementation, the analyzed app is classified based on a probability score, in which the probability score is generated to provide an indicator that the analyzed app is associated with a particular category. For example, if the analyzed app has a probability score value for the app category GAMES that exceeds a threshold value (e.g., 75% or some other value), then the analyzed app can be associated with app category GAMES. In some cases, the analyzed app can be associated with two or more app categories, such as if the analyzed app has probability score values associated with two or more app categories that each exceed the threshold value (e.g., the analyzed app can be associated with GAMES and MESSAGING, and/or, in some cases, the highest probability score value can be used to provide a primary app category (dominant category) for the analyzed app, with the other categories being provided as secondary app categories for the analyzed app (secondary categories)). In one implementation, the potential app categories are pre-configured based on an app policy. In another implementation, the potential app categories are pre-configured based on an enterprise app policy. For example, threshold probability score settings can also be configured based on an app policy and/or an enterprise app policy.

As further discussed below, the app policy and/or enterprise app policy can also configure various other requirements/criteria for apps based on the category(ies) associated with the app as well as based on whitelists/blacklists of apps, and/or based on app features and/or behaviors. For example, an (enterprise) app policy can specify rules based on an app category (e.g., an app type), such as whether the app is a social app, a game app, a messaging app, an office productivity app, a web browsing app, and/or any other category/type of app. The (enterprise) app policy can also set rules on whether an app is safe or unsafe (e.g., configured whitelists and blacklists of apps). The (enterprise) app policy can also set rules based on app behavior(s), such as whether the app behaves suspiciously/maliciously, performs location tracking, accesses a contacts/address book on the mobile device, accesses social apps/APIs, accesses a device microphone or camera, accesses a feature/function of the mobile device/operating system platform in a manner that is not consistent or in compliance with the permissions granted to the app by the user/mobile device, and/or performs any other specified behavior. The (enterprise) app policy can also set rules based on characteristics/features of the app, such as a URL/hostname associated with the app (e.g., where the app is downloaded from), a developer of the app, whether the app uses encryption (e.g., for passwords or other sensitive data), whether the app has encrypted code/data, and/or other specified characteristics/features.

In one implementation, portal 104 has multiple interfaces including the following: a policy specification interface and a report generation interface. The policy specification interface of the portal is further described below, such as shown and discussed below with respect to FIG. 4.

In one embodiment, the report generation interface shows the user which apps include features that are in violation of an app policy for the entity. For example, classification engine 120 can continually or periodically update the reports as new scans of apps are completed. In one implementation, a user is able to specify alerts if an app is determined to violate the entity's enterprise app policy. For example, the report can include a sorted list of apps based on app category classification, from most policy violations to least policy violations.

For example, the report generation interface can report app violations for ACME Company. The report can include a list of apps and source (e.g., app stores from which such apps can be downloaded), including a score, and extracted features that triggered policy violations for ACME Company's app policy that has certain criteria/requirements for apps based on the app category. In some cases, the report can include a confidence metric for each app violation (e.g., pairwise compare for each feature, threshold requirements for each feature compare, features can have different weights, such as certain features can be indicated as critical features or behaviors). In one implementation, customers can configure or customize such priorities/weights. Also, a customer can provide feedback to a report by re-categorizing an analyzed app, by categorizing certain reported violations as, for example, a verified violation, a potential violation, or not a violation, and/or to allow users of the customer to include evaluation notes, and/or to adjust weighting/scoring and/or features of interest based on the report to provide a feedback loop to improve future app violation reporting results. As another example, the customer can verify whether one or more apps in an app violation list are policy violations or not (e.g., the app can be whitelisted and/or blacklisted in the app policy).

In one embodiment, the report generation interface includes a programmatic interface (e.g., a RESTful API) to allow customers to request app violation updates/reports, receive a feed of violation updates/reports, respond to app violation updates/reports, and/or upload apps for automated categorization by the cloud service. For example, the report generation interface can allow customers to provide features manually or to provide apps for automated analysis as described above. By providing such an interface to the report generation interface, customers can integrate these services into their own customized user interface for interacting with the cloud service automated classification of apps for mobile devices.

In one implementation, the classification engine 120 implements various classification models and algorithmic techniques as further described below with respect to FIGS. 2 and 3. In an example implementation, the app meta data is stored in a data store (e.g., using an open source database, such as JSON or Apache Lucene, or other open source or commercially available databases). For certain formats of content, different databases can be used for storing and search such content, such as for images and searching or other representations.

Figure 2:
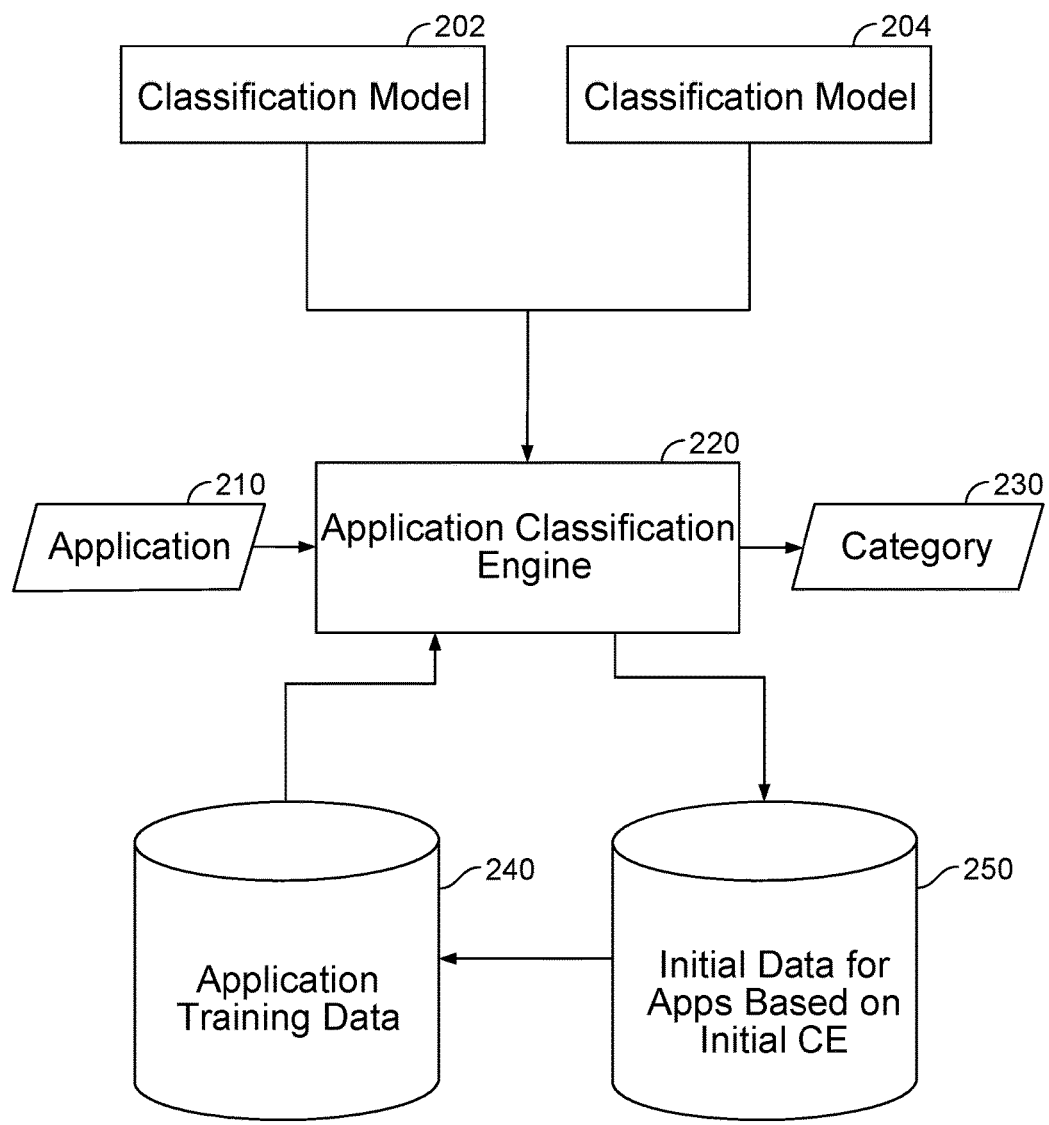
FIG. 2 is a functional block diagram of an architecture of an application classification engine for providing automated classification of apps for mobile devices in accordance with some embodiments.

FIG. 2 is a functional block diagram of an architecture of an application classification engine for providing automated classification of apps for mobile devices in accordance with some embodiments. In particular, FIG. 2 illustrates a diagram that depicts components of an automated app classification system and demonstrates the relationships between these components, such as for implementing classification engine 120 as shown in FIG. 1, in accordance with some embodiments. As shown, classification models 202 and 204 are used by application classification engine 220 to automatically classify one or more applications ("apps") 210 into an app category 230. Application classification engine 220 is in communication with a data store (e.g., a database or other type of data store) that stores app training data shown as 240 to facilitate automated app classification, as further discussed below, and another data store (e.g., a database or other type of data store) that stores initial data for apps based on results of the initial classification provided by the application classification engine (CE) shown as 250 to also provide additional/refined training data (e.g., which can be used as a feedback loop to improve performance of machine learning and other app classification algorithm techniques), as also further discussed below.

For example, the application classification engine can be implemented in software that can be executed on a server and/or a dedicated computing appliance. The application training data can be stored on the server and/or computing appliance or on a separate computing or storage device. Various applications can be retrieved from various mobile application (app) stores (e.g., to classify apps available in public app stores, enterprise/private app stores, based on various listings of apps, and/or other sources of apps, such as web sites that offer apps for downloading). The categories or categorizations can be generated as app category listings, reports, and/or data sets that can be stored on the server and/or computing appliance, as well as sent to various subscribers of a service for apps categorization (e.g., a security service for mobile applications, an enterprise MDM service, an app store service, and/or other services, customers, and/or users).

Machine learning algorithms generally use training data, one or more classification models, and probability theory implementations. In some embodiments, a system for automated mobile application classification uses machine learning techniques including the following components: one or more classification models, application training data (e.g., an initial training dataset of apps), and one or more classification algorithms, which are each discussed below.

Classification Models

In one embodiment, classification models are used to provide predefined categories and logic that describe attributes that are used in calculations. For example, the classification models used in the classification system can be varied depending on their expected outcomes, and the mechanism that is used for extracting features from the target dataset of apps. For instance, categories from which data can be extracted are listed below, and a list of potential features that can be used in classification is also provided below. These are examples only and the model, data, and features that can be collected and implemented are not limited to the following examples:

Classification Models

Application type (e.g., malware, productivity, game, and/or other application categories/types)

Common characteristics (e.g., data extracted from application binaries)

Whitelist/Blacklist classification (e.g., whether an application is safe or unsafe)

Application behavior (e.g., actions that an application performs, such as location tracking or accessing contacts/address book information, and/or other behaviors)

Feature Sets:

Network traffic

On screen text and user interface

Application included resources

Media, text images, etc.

Application collected data

Files

SMS/MMS

GPS

Camera/Microphone

In one embodiment, the classification models are used by the classification system to facilitate automated app classification. As shown in FIG. 2, classification models are provided as input to the application classification engine. For example, the classification models can implement the classification specific details of a particular classification job being performed. As an example, a Naïve Bayes approach generally involves implementing the mechanism such that the most granular piece of information can be used for the probability calculations. As such, depending on how fine or coarse-grained the data is can generally impact the calculation. Additionally, a list of potential categories that can be used for each classification can vary among classifiers. For instance, possible categories for application type classification can include "games" and "file-sharing," but for malware classification, possible categories can include "safe" and "unsafe."

Training Data

In one embodiment, training data is used by the classification system to facilitate automated app classification. For example, for each classifier, a set of training data can be used to bootstrap the classification process. Then, upon new data or iteration in classification, the classification system can be feedback driven and updated by the results of the latest classification as shown in FIG. 2 by use of data stores for the application training data as well as for the initial data for apps based on initial classification engine results.

For instance, in a mobile application classification model, the training data can be a set of applications that are already classified manually into a set of particular categories. In this case, any previously categorized application can be used as training data. In an example implementation, such application training data can be used to associate probability score values with features and/or behaviors to particular categories, such as shown in the below simplified example application training data set.

Example Training Data Set

| Feature/Behavior | Probability Value | App Category |
|---|---|---|
| Browser checks | 0.7 | Web Browser |
| Listening to microphone | 0.2 | Phone |
| Infinite Loop | 0.9 | Malware |
| Address Book/Contacts | 0.5 | Social |
| OpenGL Library | 0.5 | Game |
| Permissions | 0.4 | Malware |
| Plain text/no encryption | 0.8 | Security |

In one implementation, the above training data is generated based on analysis of the application training data. For instance, a probability value of each category can be calculated based on a count of a number of occurrences the behavior/feature is observed relative to a total number of analyzed apps in the training data set. For example, if 90% of the analyzed apps in the application training data set that were determined to include an infinite loop were classified as malware, then the probability value for the infinite loop attribute (e.g., feature/behavior) is equal to a 0.9 value as shown in the above table. Similarly, if approximately 50% of the analyzed apps in the application training data set that access address book/contacts were classified as social apps, then the probability value for the accesses address book/contacts attribute (e.g., feature/behavior) is equal to a 0.5 value as shown in the above table. Likewise, if approximately 50% of the analyzed apps in the application training data set that include the OpenGL Library were classified as gaming apps, then the probability value for the accesses OpenGL Library attribute (e.g., feature/behavior) is equal to a 0.5 value as shown in the above table. As another example, combinations of such attributes can be used to provide a probability score value for such attribute combinations (e.g., if approximately 80% of the analyzed apps in the application training data set that include the OpenGL Library, accessing the Internet, accessing the camera, and sending out SMS messages to one or more contacts were classified as gaming apps, then the probability value for this particular combination of attributes can be set to be equal to a 0.8 value). Various other techniques can be used to generate such probability value/score calculations using application training data as would now be apparent to one of ordinary skill in the art in view of the embodiments disclosed herein.

Various examples of attribute combinations/sets, such as behaviors and/or features, that can be determined to be associated with various app categories are provided below.

For example, analyzed games in some cases have been shown to be associated with the following behaviors that are common among most games based on a sample analysis of a dataset of gaming apps: accessing an Internet connection; including a graphics library (e.g., OpenGL library or another graphics library); accessing a camera; and sending SMS messages to one or more contacts. In this example dataset analysis of gaming apps, it was also observed that gaming apps do not perform the behavior of killing background processes (e.g., which can be used as an attribute to infer that such is either a risky game or that the app should be classified into a different category).

As another example, analyzed tools apps in some cases have been shown to be associated with the following behaviors that are common among most tools apps based on a sample analysis of a dataset of tools apps: accessing a microphone and recording audio; writing automated SMS messages; modifying system settings; accessing external storage; searching files; and reading and collecting data related to the battery usage. In this example dataset analysis of tools apps, it was also observed that tools apps do not include graphics libraries or accessing of cameras (e.g., which can be used as an attribute to infer that the app should be classified into a different category).

As yet another example, analyzed business apps in some cases have been shown to be associated with the following behaviors that are common among most business apps based on a sample analysis of a dataset of business apps: accessing calendar entries to read and/or write; recording audio; accessing a list of accounts in the system; and accessing a VPN (Virtual Private Network) client/function. In this example dataset analysis of business apps, it was also observed that business apps do not perform the behavior of killing background processes (e.g., which can be used as an attribute to infer that the app should be classified into a different category).

As an additional example, analyzed productivity apps in some cases have been shown to be associated with the following behaviors that are common among most productivity apps based on a sample analysis of a dataset of productivity apps: accessing contacts; accessing a calendar for read and write (e.g., such calendar access behavior is typically associated with productivity apps and not with gaming apps, such that this is an attribute that can provide an indicator for determining that an analyzed app should be classified as a productivity app and not a gaming app); accessing an Internet connection; and checking installed accounts with which to integrate. In this example dataset analysis of productivity apps, it was also observed that productivity apps do not perform the behavior of executing system calls (e.g., which can be used as an attribute to infer that the app should be classified into a different category).

As a final example, analyzed education apps (e.g., such apps generally interact with the Internet and install or download related educational packages on the mobile device) in some cases have been shown to be associated with the following behaviors that are common among most education apps based on a sample analysis of a dataset of education apps: accessing an Internet connection; creating internal windows/boxes inside of a main app; downloading/installing packages; writing to a calendar; and including a graphics library (e.g., OpenGL library or another graphics library). In this example dataset analysis of gaming apps, it was also observed that gaming apps do not perform the behavior of killing background processes (e.g., which can be used as an attribute to infer that such is either a risky game or that the app should be classified into a different category). In this example, an educational app can also include an OpenGL library, which is generally seen in games more than any other app category. This can be interpreted in, for example, two ways. First, the app can be an educational game, such that the app can be properly classified into both the education and game app categories. Second, the app can share two behaviors that are more often associated with games, but because the app downloads and installs extra packages, the app can be determined to more likely belong to the education app category (e.g., which can be reflected in different probability values/scores that can be associated with this set of attributes).

As shown in FIG. 2, application training data is used by the application classification engine. For example, the application classification engine can include a collection of all collected applications from various mobile device operating system (OS) platforms including, for example, Android®, Apple iOS®, Blackberry®, and/or Microsoft Windows® Mobile platforms. The application classification engine generally utilizes training data for each classification model. For each classification model initially, there can be a bootstrapping process that classifies a number of sample applications for each category. Generally, the larger the training data set, the more accurate a classification can be for that iteration of executing the application classification engine for that input set of mobile applications for classification.

As discussed above and further below, a classifier (e.g., implemented using the application classification engine) can also be feedback driven. For example, the training dataset can be modified and extended by the classification engine whenever a new application is classified using the system as also shown in FIG. 2 using a second data store 250 (e.g., in some implementations data store 240 and data store 250 can be implemented using a single data store or can be implemented on separate data stores as shown in FIG. 2). This approach allows the classification system to improve the quality of its classifications the longer it is trained and with an increasing number of applications analyzed and classified.

Classification Algorithms

In one embodiment, one or more classification algorithms are used by the classification system to facilitate automated app classification. For example, various machine learning algorithm techniques can be implemented to facilitate automated app classification. The following are example algorithms that can be used in a system for automated mobile application classification: Naïve Bayes with TF-IDF (Term Frequency-Inverse Document Frequency), Bayesian Networks, and Decision Trees. As would now be apparent to one of ordinary skill in the art in view of the various embodiments disclosed herein, various other or similar algorithms can be used to implement the various techniques for automated mobile application classification as described herein.

Application Classification Engine

In one embodiment, the application classification engine is used by the classification system to facilitate automated app classification. In some implementations, the application classification engine as shown in FIG. 2 is provided as a generic implementation of a Naïve Bayes classifier algorithm that allows classification models to be defined outside of the classification engine and be used in the algorithm without implementing an individual classifier for each classification type.

Naïve Bayes Algorithm

The Naïve Bayes algorithm is generally designed to calculate explicit probabilities for any hypotheses. Bayesian learning is based on the Bayes theorem which provides a method for calculating posterior probability $p(h|D)$ from their prior probability $P(h)$ along with $P(D)$ and $P(D|h)$ (where D is the training data set and h is the hypothesis).

$$P(h|D)=P(D|h)P(h)/P(D)$$

For example, steps involved in Naïve Bayes learning can include the following functional operations: first, specifying the most granular piece of data in each dataset (e.g., defined by a designer); second, calculating the probabilities of each possible hypothesis (e.g., defined by a designer); and third, comparing the probabilities of the data that needs to be classified with previously classified training data available.

As mentioned above, steps 1 and 2 can be defined by a designer. The algorithm does not need to specify exactly how those steps should be performed.

Application of Naïve Bayes to Mobile Application Classification

As discussed above, there are multiple classification models for application classification. To be able to effectively classify applications, a predefined set of categories can be provided.

Various classification models that are used by the classification system in accordance with some embodiments are discussed below.

Initial Categories for Rules & Signatures

In some embodiments, in order to implement the various classification models discussed below, the rules and signatures extracted from the application analysis stages are categorized into a set of predefined categories. For example, all rules and signatures related to network calls can be categorized under network activities. Network activities can have sub-categories for more granular classifications (e.g., telephone activities, voice over IP (VOIP) activities, music streaming activities, movie streaming activities, and/or other network related activities that can be categorized to more specific network related activities). These are examples given to classify applications based on their behavior, and while signatures can be used as a classifier, data analysis-based techniques can also be applied, such as based on the following data: text presented on the screen, data sent or received over networks (e.g., SMS, email, and/or HTTP traffic), and/or other data.

Behavioral Classification

In some embodiments, a behavioral classification model is provided. In some embodiments, a classification model trains the classifier to classify applications based on their behavior that is extracted during behavioral analysis (e.g., monitored during execution in a virtualized platform environment, such as using an app platform emulation). For example, the extracted behaviors from the application can be stored in textual format and can be classified using rules and signatures as discussed above.

Type Classification

In some embodiments, a type classification model is provided. Similar to behavioral categorization techniques, type classification can be implemented using a predefined set of types and the possible rules and signatures each type can include. In some implementations, the calculations can be similar as used in behavioral classification. For instance, a probability of each category can be provided as the count of number of occurrences of the behavior.

Whitelist/Blacklist Classification

In some embodiments, a whitelist/blacklist classification model is provided. For example, a whitelist/blacklist classification model can include "Safe" and "Unsafe" as possible categories of apps. A list of various safe and unsafe behaviors of apps can be used for determining if an application should be whitelisted or blacklisted. In some cases, an app that does not match safe or unsafe behaviors can be classified as unknown (e.g., or further analysis recommended or needed for classification of that app).

Common Characteristics Classification

In some embodiments, a common characteristics classification model is provided. In a common characteristics classification model, aspects that are considered are general similarities found in each application. For instance, hostnames, URLs, and IPs (e.g., and or various other attributes) can be used to determine if an application is similar to any other application(s) in terms of network activity.

In some implementations, a common characteristics classification is different than the models discussed above, because there is no predefined set of categories. For example, a safety classifier can be customized, such as in an app policy or an enterprise app policy configuration.

Automated Rules and Signatures Classification

In some embodiments, once an initial set of rules and signatures are generated, new rules and signatures added to the system can be classified automatically using, for example, Natural Language Processing (NLP) techniques. For example, an NLP classification component of the system can use the above-described classification engine and apply its own model "RulesSignatureClassifier" as further described below with respect to FIG. 3.

In an example implementation, an automated rules and signatures classifier uses an initial categorized set of rules and signatures for the classification models discussed above, and using NLP techniques, the automated rules and signatures classifier automatically classifies the new rules and signatures for each of the classification models.

Figure 3:
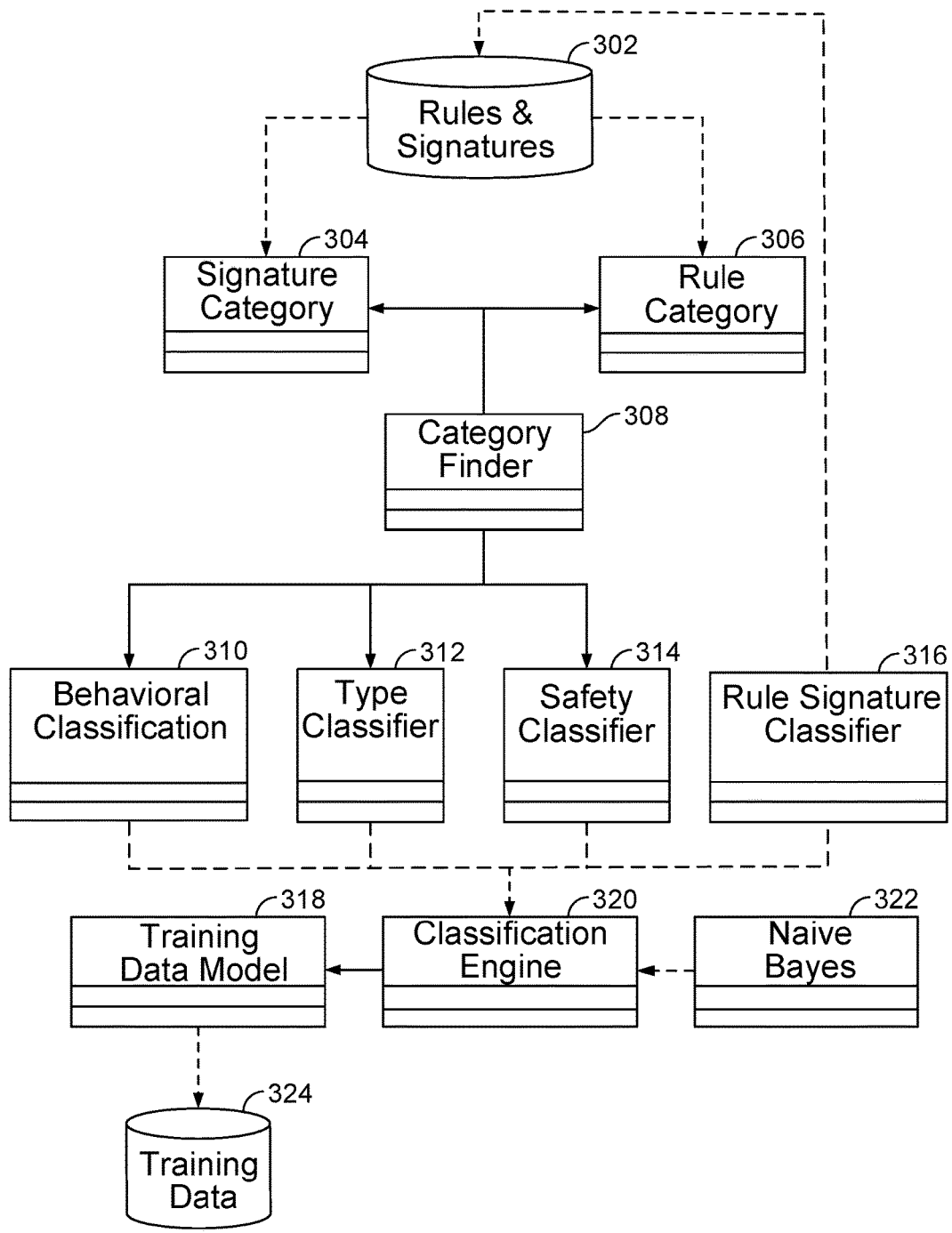
FIG. 3 is a functional block diagram of a system for providing automated classification of apps for mobile devices in accordance with some embodiments.

FIG. 3 is a functional block diagram of a system for providing automated classification of apps for mobile devices in accordance with some embodiments. In particular, FIG. 3 illustrates a diagram that depicts components of an architecture of a system for providing automated mobile application classification and shows various relationships between these components in accordance with some embodiments.

As shown in FIG. 3, a rules and signatures data store 302 is in communication with a signature category 304 and rule category 306, which are each in communication with a category finder 308. Category finder 308 is in communication with various classification engine components, including as shown, the following: behavioral classification 310, type classifier 312, safety classifier 314, and rules signature classifier 316. These classifiers communicate with classification engine 320, which is in communication with Naïve Bayes component 322 (e.g., other classification algorithms that can be implemented, as described above, such as Bayes with term frequency-inverse document frequency (TF-IDF), Bayesian Networks, and Decision Trees) and with training data model 318, which is in communication with training dataset store 324. Each of the components shown in FIG. 3 is discussed further below.

Rules and Signatures Data Store

In some embodiments, rules and signature data store 302 (e.g., a database or another type of data store) is used to store extracted rules and signatures. In addition, metadata can also be stored along with the stored extracted rules and signatures, including for example, information related to category, impact, and/or rule. For instance, information related to what categories define network activity can be stored.

Category Finder

In some embodiments, a category finder component, shown as category finder 308, determines the category of a particular rule or signature. For example, the category finder can search for a categorical match based on which classification model requests the category. Each classification model can implement varied types of rules and signatures for categorization, and the category finder allows the individual classification algorithm to be agnostic of the individual categories. For example, implementing this layer can abstract the category detection of rules and signatures from the classification models and can enable the system to be more extensible in supporting multiple classification models.

Classification Engine

In some embodiments, a classification engine component, shown as classifiers 310, 312, 314, and 316, implements the various machine learning algorithms that are used by each of the classification models. For example, this can be implemented as a generic classifier that can load the entirety of the training data, marshal communication between itself and the classification models, and provide a final classification: all possible app categories, described in probabilities, of a submitted application that has been analyzed by the classification system.

Classification Models—Behavioral Model

In some embodiments, a behavior model component, shown as behavioral classification 310, performs behavior related classification. For example, the classification engine can provide the training data to this classifier, and it will determine the category of the application in regards to the rules and signatures using the category finder.

Classification Models—Type Model

In some embodiments, a type model, shown as type classifier 312, classifies the application type based on a variety of aspects or attributes, including for example, extracted behavior, program text, user interface, network traffic, and/or other aspects or attributes. For example, this model can use the category finder to determine the type of application.

Classification Models—Safety Model

In some embodiments, a safety model, shown as safety classifier 314, determines whether the application belongs to a safe or unsafe category based on extracted behavior, features, and/or other attributes. For example, the category finder in this case can return either safe or unsafe for each rule or signature.

Rules Signature Classifier

In some embodiments, a rules and signature classifier, shown as rules signature classifier 316, is provided to automate classification of rules and signatures in regards to each classification model. For example, after an initial classification of all rules and signatures, the rules and signature classifier can be used to automatically determine the app category of new rules and signatures.

Training Models

In some embodiments, training models, shown as training data model 318, are provided. For example, the training models layer can provide formatted data to classification engine 320. The format of the data in some cases can be modified before being passed to the classification model (e.g., this can include text or image normalization, term frequency, inverse document frequency cutoffs, and other filters designed to normalize and refine data).

Training Data Database

In some embodiments, training data, shown as training data 324, is provided. For example, the data store that maintains the training data can store all application-related data, including raw data, normalized data, meta data, and training data.

FIG. 4 is a screen diagram illustrating a graphical user interface of a system for providing automated classification of apps for mobile devices in accordance with some embodiments. In particular, FIG. 4 provides a screen shot of a policy interface for configuring a policy to be applied by the classification system, such as the classification system described above and shown in FIGS. 1-3. For example, a user of the classification system can create a compliance policy based on corporate security and/or other app usage related rules using such a policy interface, and the configured policy can be implemented by the classification system for automatically classifying analyzed apps into "safe" or "unsafe" app categories, which can then be used to whitelist or blacklist those apps.

FIG. 5 is another screen diagram illustrating a graphical user interface of a system for providing automated classification of apps for mobile devices in accordance with some embodiments. In particular, FIG. 5 provides a screen shot of a reporting interface for accessing app reports generated by the classification system, such as the classification system described above and shown in FIGS. 1-3. For example, on a "My Apps" page of the user interface of the classification system, apps that violate the policy can be displayed and the number of violating behaviors for each app can be displayed in a red box.

Figure 6:
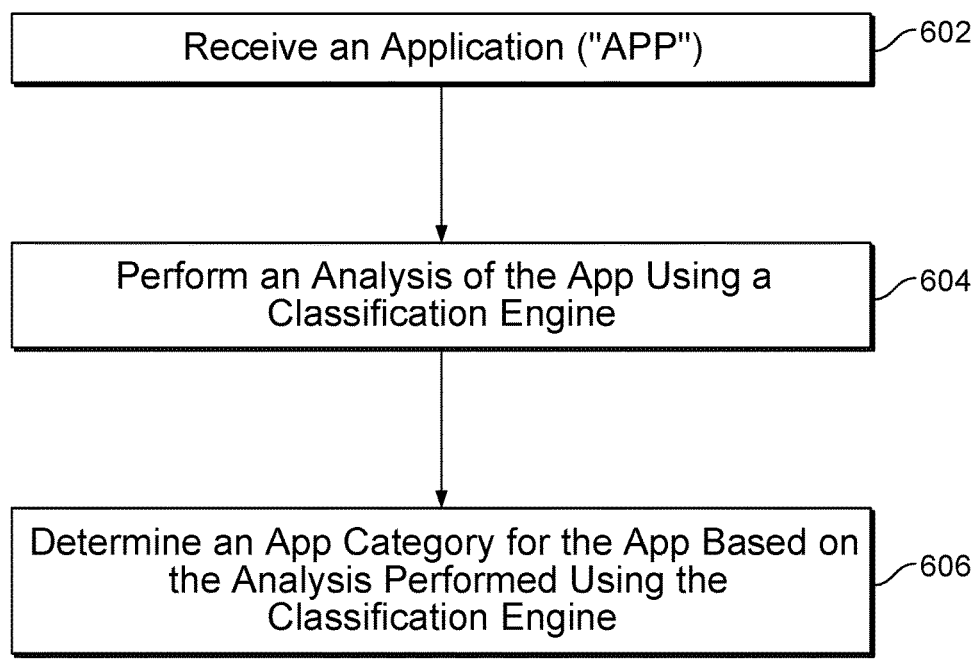
FIG. 6 is a flow diagram illustrating a process for providing automated classification of apps for mobile devices in accordance with some embodiments.

FIG. 6 is a flow diagram illustrating a process for providing automated classification of apps for mobile devices in accordance with some embodiments. For example, the process can be performed using the cloud service and classification engine described above with respect to FIGS. 1-3.

At 602, an application ("app") is received. For example, an app can be pushed or pulled from an app source (e.g., public or private app store or another app data source) for automated app classification.

At 604, an analysis of the app using a classification engine is performed. For example, various feature and behavioral analysis, including both static and dynamic analysis techniques can be performed using various machine learning algorithms to facilitate an automated app categorization of the app.

At 606, an app category for the app is determined based on the analysis performed using the classification engine. For example, an app can be classified into one or more app categories. Example app categories can include business, calendar, electronic mail (e-mail), file sharing/cloud storage, games, maps, messaging, music, office productivity, photo, social video, web browser, and/or other app categories. In some implementations, a given app can be classified into one or more app categories.

Figure 7:
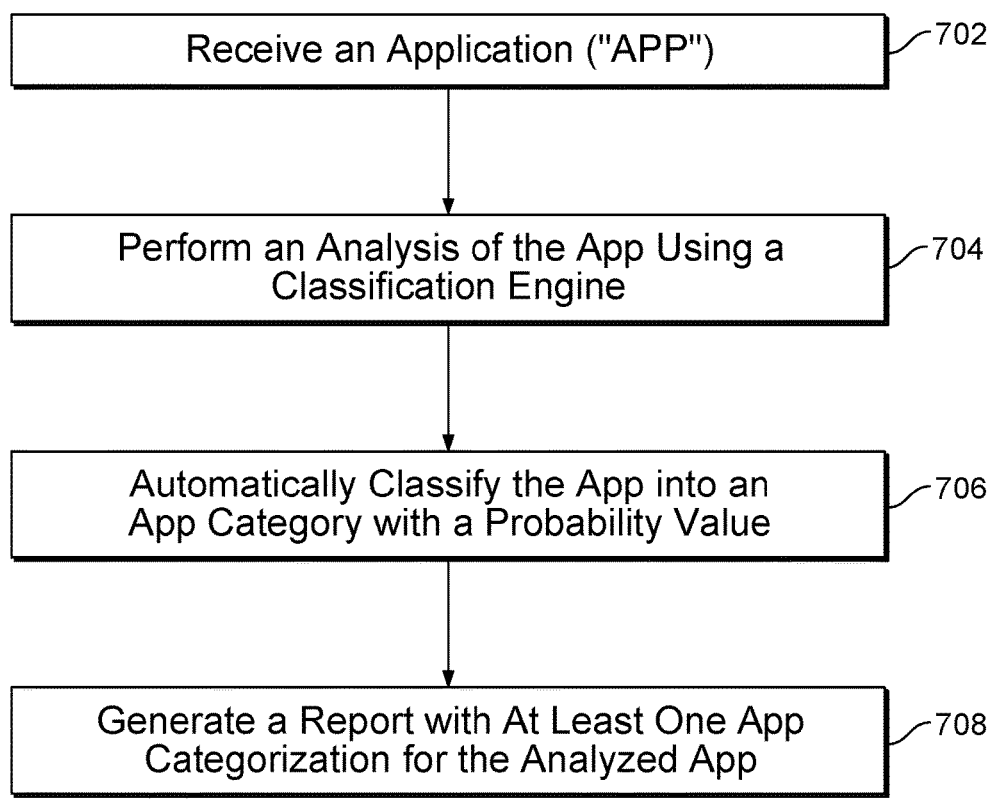
FIG. 7 is another flow diagram illustrating a process for providing automated classification of apps for mobile devices in accordance with some embodiments.

FIG. 7 is another flow diagram illustrating a process for providing automated classification of apps for mobile devices in accordance with some embodiments. For example, the process can be performed using the cloud service and classification engine described above with respect to FIGS. 1-3.

At 702, an application ("app") is received. For example, an app can be pushed or pulled from an app source (e.g., public or private app store or another app data source) for automated app classification.

At 704, an analysis of the app using a classification engine is performed. For example, various feature and behavioral analysis, including both static and dynamic analysis techniques can be performed using various machine learning algorithms to facilitate an automated app categorization of the app.

At 706, an app category for the app is determined with a probability value based on the analysis performed using the classification engine. For example, the app can be classified with a probability value that the app is associated with the app category. In an example implementation, the app categorization can be determined at least in part based on an app behavior (e.g., one or more behaviors performed by the app monitored during execution of the app, such as by monitoring dynamic behavior of the app during execution of the app in an emulation environment).

At 708, a report is generated with at least one app categorization for the analyzed app. For example, the report can include at least one suggested app for the app category to suggest as an alternative to the app if it is not approved for the app category. In some cases, if the app is not approved based on an app policy, then the report can include at least one suggested app for the app category based on the app policy. As another example, if the app is not approved based on an enterprise app policy, then the report can include at least one suggested app for the app category based on the enterprise app policy (e.g., in which the enterprise app policy can be configurable by an enterprise for managing apps on mobile devices associated with the enterprise, which allows for an enterprise customizable/configurable app policy to indicate safe and unsafe apps for one or more app categories). As yet another example, if the app is a blacklisted app for the app category based on the app policy, then the report can include at least one suggested app for the app category, in which the at least one suggested app for the app category is a whitelisted app for the app category based on the app policy (e.g., if the app category is file sharing/cloud storage, and the app policy has blacklisted a SHARE-ALL app, but the app policy has whitelisted an OPEN-FILE-SHARE app, then the report can suggest the OPEN-FILE-SHARE app as an approved/whitelisted file sharing app that can be used as an alternative to the unapproved/blacklisted SHARE-ALL app for the file sharing/cloud storage app category).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for automated classification of applications ("apps") for mobile devices, comprising:
   a processor configured to:
      receive an application ("app");
      perform an analysis of the app using a classification engine, comprising to:
         extract at least one feature of the app;
      determine an app category for the app based on the analysis performed using the classification engine, comprising to:
         determine the app category for the app based on the at least one feature, wherein the determining of the app category comprises to:
            in response to a determination that the app relates to a plurality of app categories, select a first app category or a second app category to be the app category depending on whether a first probability value of the first app category is higher than a second probability value of the second app category or the second probability value of the second app category is higher than the first probability value of the first app category, respectively, the first app category being different from the second app category, wherein the plurality of app categories includes the first app category and the second app category, wherein a probability value is determined based on the at least one feature;
      determine whether the app is a blacklisted app for the determined app category based on an app policy; and
      in response to a determination that the app is the blacklisted app for the determined app category, suggest another app in the determined app category that is not blacklisted; and
   a memory coupled to the processor and configured to provide the processor with instructions.

2. The system recited in claim 1, wherein the processor is further configured to:

automatically classify the app into the app category using the classification engine.

3. The system recited in claim 1, wherein the processor is further configured to:
automatically classify the app with the probability value that the app is associated with the app category using the classification engine.

4. The system recited in claim 1, wherein the processor is further configured to:
automatically classify the app with the probability value based on an app behavior that the app is associated with the app category using the classification engine.

5. The system recited in claim 1, wherein the processor is further configured to:
generate a report with at least one app categorization for the app.

6. The system recited in claim 1, wherein the processor is further configured to:
generate a report with at least one app categorization for the app, wherein the report includes at least one suggested app for the app category as an alternative to the app that is not approved for the app category.

7. The system recited in claim 1, wherein the processor is further configured to:
generate a report with at least one app categorization, wherein the app is not approved based on an app policy, and wherein the report includes at least one suggested app for the app category based on the app policy.

8. The system recited in claim 1, wherein the processor is further configured to:
generate a report with at least one app categorization, wherein the app is not approved based on an enterprise app policy, and wherein the report includes at least one suggested app for the app category based on the enterprise app policy.

9. The system recited in claim 1, wherein the processor is further configured to:
generate a report with at least one app categorization, wherein the app is not approved based on an enterprise app policy, wherein the report includes at least one suggested app for the app category based on the enterprise app policy, and wherein the enterprise app policy is configurable by an enterprise for managing apps on mobile devices associated with the enterprise.

10. The system recited in claim 1, wherein the processor is further configured to:
generate a report with at least one app categorization, wherein the app is not approved based on an app policy, wherein the report includes at least one suggested app for the app category based on the app policy, wherein the app is a blacklisted app for the app category based on the app policy, and the at least one suggested app for the app category is a whitelisted app for the app category based on the app policy.

11. A method of automated classification of applications ("apps") for mobile devices, comprising:
receiving an application ("app");
performing an analysis of the app using a classification engine executed on a processor, comprising:
extracting at least one feature of the app;
determining an app category for the app based on the analysis performed using the classification engine, comprising:
determining the app category for the app based on the at least one feature, wherein the determining of the app category comprises:
in response to a determination that the app relates to a plurality of app categories, selecting a first app category or a second app category to be the app category depending on whether a first probability value of the first app category is higher than a second probability value of the second app category or the second probability value of the second app category is higher than the first probability value of the first app category, respectively, the first app category being different from the second app category, wherein the plurality of app categories includes the first app category and the second app category, wherein a probability value is determined based on the at least one feature;
determining whether the app is a blacklisted app for the determined app category based on an app policy; and
in response to a determination that the app is the blacklisted app for the determined app category, suggesting another app in the determined app category that is not blacklisted.

12. The method of claim 11, further comprising:
automatically classifying the app into the app category using the classification engine.

13. The method of claim 11, further comprising:
automatically classifying the app with the probability value that the app is associated with the app category using the classification engine.

14. The method of claim 11, further comprising:
automatically classifying the app with the probability value based on an app behavior that the app is associated with the app category using the classification engine.

15. The method of claim 11, further comprising:
generating a report with at least one app categorization for the app.

16. A computer program product for automated classification of applications ("apps") for mobile devices, the computer program product being embodied in a tangible non-transitory computer readable storage medium and comprising computer instructions for:
receiving an application ("app");
performing an analysis of the app using a classification engine, comprising:
extracting at least one feature of the app;
determining an app category for the app based on the analysis performed using the classification engine, comprising:
determining the app category for the app based on the at least one feature, wherein the determining of the app category comprises:
in response to a determination that the app relates to a plurality of app categories, selecting a first app category or a second app category to be the app category depending on whether a first probability value of the first app category is higher than a second probability value of the second app category or the second probability value of the second app category is higher than the first probability value of the first app category, respectively, the first app category being different from the second app category, wherein the plurality of app categories includes the first app category and the second app category, wherein a probability value is determined based on the at least one feature;
determining whether the app is a blacklisted app for the determined app category based on an app policy; and in response to a determination that the app is the blacklisted app for the determined app category, suggesting another app in the determined app category that is not blacklisted.

17. The computer program product recited in claim 16, further comprising computer instructions for:
    automatically classifying the app into the app category using the classification engine.

18. The computer program product recited in claim 16, further comprising computer instructions for:
    automatically classifying the app with the probability value that the app is associated with the app category using the classification engine.

19. The computer program product recited in claim 16, further comprising computer instructions for:
    automatically classifying the app with the probability value based on an app behavior that the app is associated with the app category using the classification engine.

20. The computer program product recited in claim 16, further comprising computer instructions for:
    generating a report with at least one app categorization for the app.

* * * * *